(12) United States Patent
Yasutomi et al.

(10) Patent No.: US 11,176,530 B2
(45) Date of Patent: Nov. 16, 2021

(54) PAYMENT TERMINAL

(71) Applicant: PANASONIC INTELLECTUAL PROPERTY MANAGEMENT CO., LTD., Osaka (JP)

(72) Inventors: Kenya Yasutomi, Kanagawa (JP); Bunzo Goto, Kanagawa (JP); Takeshi Goto, Kanagawa (JP); Tadayuki Takanashi, Kanagawa (JP); Akihito Shimode, Kanagawa (JP); Ryota Minami, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/723,081

(22) Filed: Dec. 20, 2019

(65) Prior Publication Data

US 2020/0342433 A1    Oct. 29, 2020

(30) Foreign Application Priority Data

Apr. 24, 2019  (JP) .............................. JP2019-083216

(51) Int. Cl.
*G07F 7/08*    (2006.01)
*G06Q 20/20*   (2012.01)
(Continued)

(52) U.S. Cl.
CPC ......... *G06Q 20/204* (2013.01); *G06Q 20/352* (2013.01); *G07G 1/0018* (2013.01)

(58) Field of Classification Search
CPC ... G06Q 20/204; G06Q 20/352; G07G 1/0018
(Continued)

(56) References Cited

U.S. PATENT DOCUMENTS 7,281,656 B2 * 10/2007 Nagata ................... G06K 7/084
                                                        235/449
8,010,046 B2    8/2011 Goto
(Continued)

FOREIGN PATENT DOCUMENTS

EP    0843274 A2 *  5/1998 ........... G06K 7/0004
JP    2012-185543 A    9/2012

OTHER PUBLICATIONS

Design for secure SMART card reader and Wi-Fi interface for Point of Sale terminal; Dec. 2009 | Rad, H.A. et al. | 2009 Second International Conference on Environmental and Computer Science (pp. 204-207), 2009.*

*Primary Examiner* — Rokib Masud
(74) *Attorney, Agent, or Firm* — Greenblum & Bernstein, P.L.C.

(57) ABSTRACT

A payment terminal includes a magnetic card reader slot having a magnetic head, an IC card reader slot configured to be front of a user, and a first board with a touch area for a contactless payment arranged diagonally upward toward the user. The magnetic card reader slot is arranged toward the user obliquely upward with respect to a direction parallel to the plane. The magnetic card reader slot and the IC card reader slot are arranged, so that a swipe direction of the magnetic card into the magnetic card reader slot and an insertion direction of an IC card into the IC card reader slot are substantially perpendicular to each other. The magnetic card reader slot, the IC card reader slot, and the first board are arranged in this order from the plane in a height direction.

18 Claims, 6 Drawing Sheets

(51) Int. Cl.
*G07G 1/00* (2006.01)
*G06Q 20/34* (2012.01)

(58) Field of Classification Search
USPC .................................................... 705/16, 17
See application file for complete search history.

(56) References Cited

U.S. PATENT DOCUMENTS

| | | |
|---|---|---|
| 9,542,575 B2 | 1/2017 | Yasutomi et al. |
| 9,811,694 B2 | 11/2017 | Yamamoto et al. |
| 10,366,384 B2 | 7/2019 | Sasaki et al. |
| 2009/0094700 A1 | 4/2009 | Goto et al. |
| 2015/0161601 A1 | 6/2015 | Matsumoto et al. |

\* cited by examiner

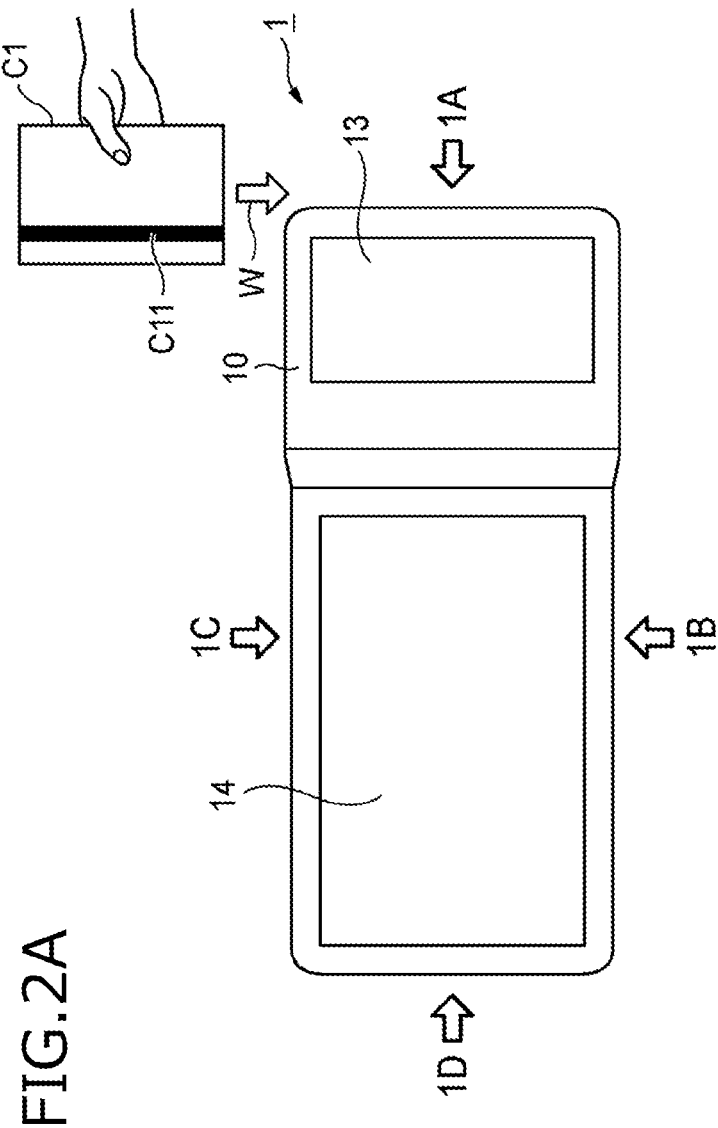
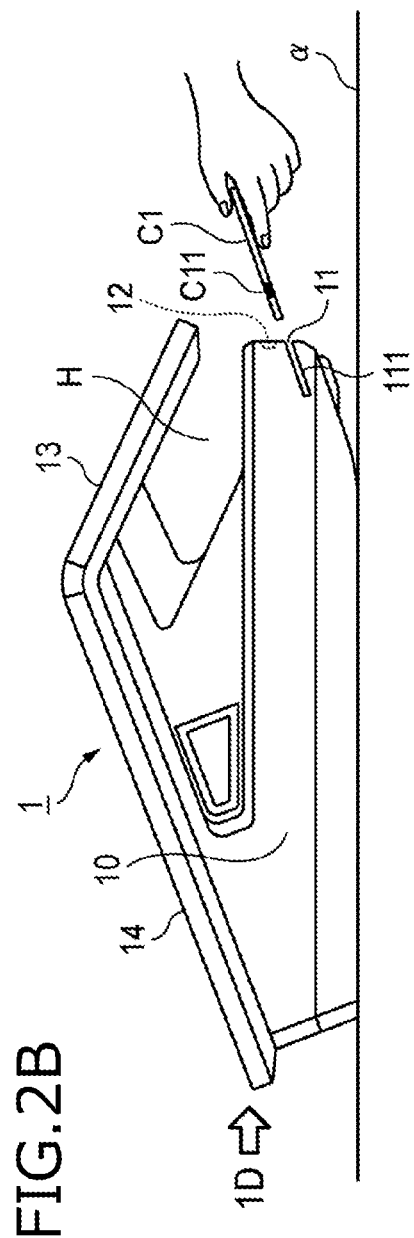

PAYMENT TERMINAL

BACKGROUND OF THE INVENTION

1. Field of the Invention

The present invention relates to a payment terminal.

2. Description of the Related Art

JP-A-2012-185543 discloses a portable payment terminal having a payment function, in which a payment terminal main body is intensively and integrally provided with a printing unit for performing printing on a recording medium, an operation unit operated by a terminal operator, a contactless IC medium reading unit for reading information from a contactless IC medium and writing information to the contactless IC medium, a magnetic information reading unit for reading magnetic information from a magnetic medium, a code reading unit for reading a code, a contact medium card reading unit for reading information from a contact IC medium, an authentication information input unit for inputting authentication information corresponding to the contact IC medium, and a battery mounting part on which a battery for supplying electric power to the payment terminal main body is mounted.

In recent years, with the progress of cashless, payment methods used in stores are diversifying. The payment methods include credit payment in which a magnetic card is used, payment with a contact IC card, and contactless payment with a card, a smartphone terminal, and the like (hereinafter, may be abbreviated as a "card and the like").

On a counter in a store, objects other than the payment terminal, such as a cash register, a sale article, and a sale promotion article are also arranged. As a result, the free space at the counter is squeezed. From the viewpoint of space saving, it is required to achieve a payment terminal in which the plurality of payment units described above are aggregated. Further, the payment terminal is required to be miniaturized.

There are many payment terminals capable of performing payment by a plurality of methods. However, when the payment terminal has a contactless payment function and another payment function at the same time, erroneous recognition occurs as will be described below. When a card or a terminal is placed in a predetermined area of the payment terminal, antenna used for the contactless payment reacts to the card or the terminal in the predetermined area and triggers processing for performing the contactless payment. Then, even when a user attempts to perform payment using a payment method other than the contactless payment (for example, a payment of a magnetic method or a contact IC method), processing of the contactless payment may be executed first. That is, when a process of the contactless payment is conducted due to operation of the user who desires to use a payment method other than the contactless payment (particularly, swipe operation of a magnetic card), the payment terminal may recognize that the process of the contact payment is erroneous. Therefore, a payment terminal for avoiding the erroneous recognition is required.

Further, from the viewpoint of security, it is desired that a user who is a customer of a store performs payment operation using a card or the like. From this viewpoint, a user interface corresponding to each of the plurality of payment methods is required to be easy to understand for the user, and the payment operation is also required to be smooth.

However, it is difficult to simultaneously achieve the above-described miniaturization request, avoidance of erroneous recognition, easy understanding for the user, and smoothness of the payment operation.

SUMMARY OF THE INVENTION

The present disclosure has been made in view of the above problems, and an object thereof is to provide a payment terminal that simultaneously achieves miniaturization of the payment terminal, avoidance of erroneous recognition, easy understanding for the user, and smoothness of the payment operation.

The present disclosure provides a payment terminal including: a magnetic card reader slot having a magnetic head, the magnetic head being positioned closer to a plane on which the payment terminal is placed than a part of a magnetic card where a user holds when swiping the magnetic card into the magnetic card reader slot, an IC card reader slot configured to be front of a user, and a first board with a touch area for a contactless payment arranged diagonally upward toward the user, in which the magnetic card reader slot is arranged toward the user obliquely upward with respect to a direction parallel to the plane, the magnetic card reader slot and the IC card reader slot are arranged, so that a swipe direction of the magnetic card into the magnetic card reader slot and an insertion direction of an IC card into the IC card reader slot are substantially perpendicular to each other, and the magnetic card reader slot, the IC card reader slot, and the first board are arranged in order from the plane in a height direction.

BRIEF DESCRIPTION OF THE DRAWINGS

FIGS. 2A and 2B are a top view and a side view respectively, which show a method of using a magnetic card reader slot 11 in the payment terminal 1 shown in FIGS. 1A to 1C.

DETAILED DESCRIPTION OF THE EXEMPLARY EMBODIMENTS

Hereinafter, details will be described with reference to the drawings as appropriate. It should be noted that the accompanying drawings and the following description are provided to enable those skilled in the art to fully understand the present disclosure, and are not intended to limit the subject matter described in the claims.

Figure 1C:
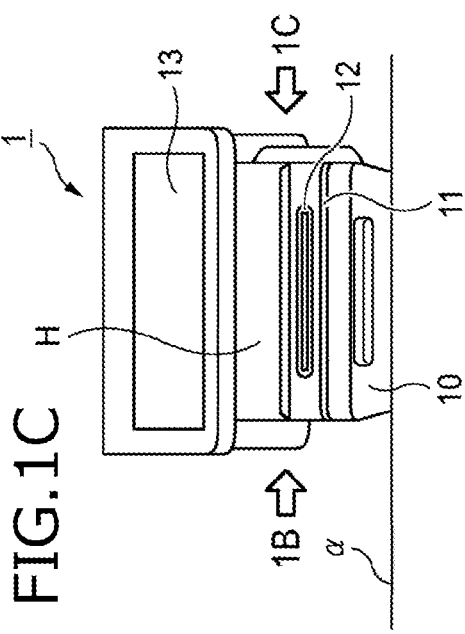
FIGS. 1A, 1B and 1C are a top view, a side view, and a front view respectively, which show an embodiment of a payment terminal 1 of the present disclosure.
Figure 1A:
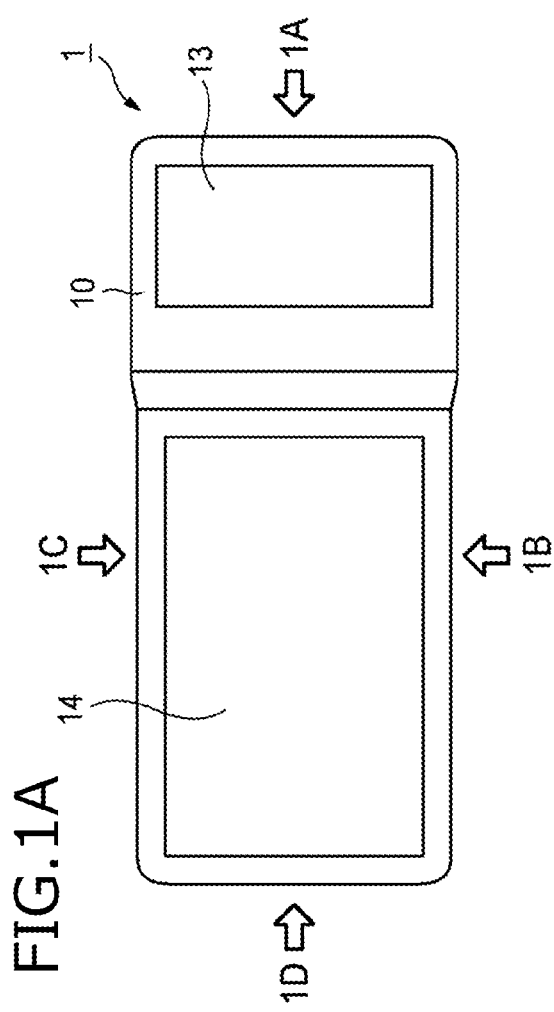
Figure 1B:
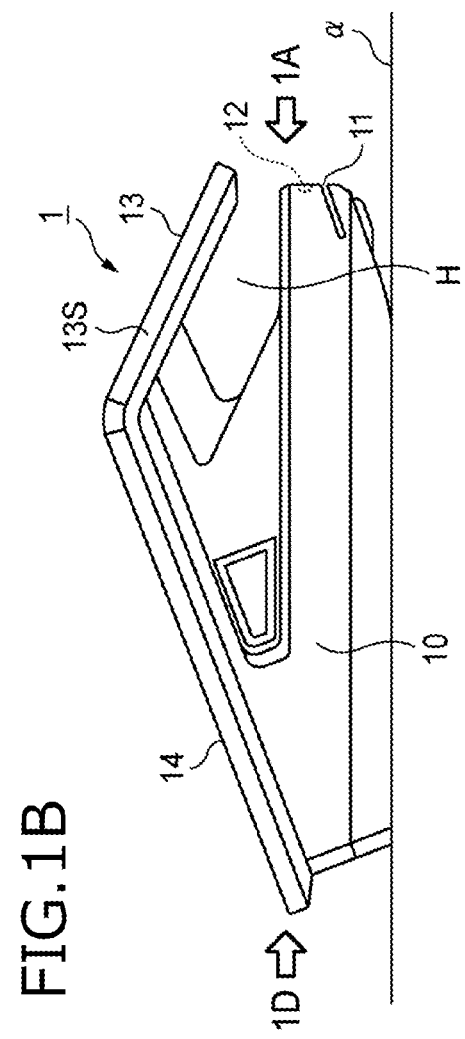

FIGS. 1A, 1B and 1C are a top view, a side view, and a front view respectively, which show an embodiment of a payment terminal 1 of the present disclosure.

The payment terminal 1 of the present disclosure has a main body 10. The main body 10 generally exhibits a box shape. FIG. 1 shows the front surface 1A, a side surface 1B, a side surface 1C, and a rear surface 1D of the payment terminal 1. In the payment terminal 1, a user who performs the payment operates a card or the like from the front surface 1A side. In the payment terminal 1, an employee (store clerk) in a store operates the payment terminal 1 from the rear surface 1D side.

The payment terminal 1 is a composite payment terminal in which a user can select one payment method among a plurality of payment methods. The payment terminal 1 is used in a state of being placed on a plane $\alpha$, such as a counter of a store.

The magnetic card reader slot 11, the IC card reader slot 12, and a board 13 having a touch area for contactless payment are arranged in this order from the plane $\alpha$ in a height direction. That is, among the three types of payment methods, the board 13 having the touch area for contactless payment is provided at a position farthest from the plane $\alpha$ in the height direction. It is not intended to exclude that the payment terminal further includes units corresponding to other payment methods.

Further, the magnetic card reader slot 11, the IC card reader slot 12, and the board 13 having the touch area for contactless payment are all gathered at the front surface 1A side of the payment terminal 1 that faces the user who performs the payment. With this configuration, the user may select any one of the plurality of payment methods arranged in front of the eyes of the user. Accordingly, it is easy for the user to understand. Since the plurality of payment methods are gathered at one part of the payment terminal 1, the payment operation as described below with reference to FIGS. 2A to 4B in each payment method can be performed smoothly.

Side surfaces 13S, a second board 14, and an open space H shown in FIG. 1B will be described below.

FIGS. 2A and 2B are a top view and a side view respectively, which show a method of using the magnetic card reader slot 11 in the payment terminal 1 shown in FIGS. 1A to 1C. The user facing the front surface 1A (front) of the payment terminal 1 swipes a magnetic card C1 in a direction w that is shown in FIG. 2A and is substantially parallel to the plane $\alpha$.

The magnetic card C1 includes at least one magnetic stripe C11. On the other hand, the magnetic card reader slot 11 includes a magnetic head 111. The magnetic stripe C11 is brought into contact with the magnetic head 111, thereby reading and writing data between the payment terminal 1 and the magnetic card C1 are performed.

Here, when the user faces the front of the IC card reader slot 12 described below, a direction of the magnetic card reader slot 11 is toward the user. The magnetic card reader slot 11 extends obliquely upward with respect to a direction parallel to the plane $\alpha$. Therefore, when the user swipes the magnetic card into the magnetic card reader slot 11 from the right to the left direction (the direction w in FIG. 2A), the magnetic stripe C11 of the magnetic card C1 is arranged closer to the plane $\alpha$ relative to a position part of the magnetic card C where the user holds. With this configuration, the user can smoothly perform the swipe operation and a hand holding the magnetic card C1 does not collide with the plane $\alpha$.

Figure 3A:
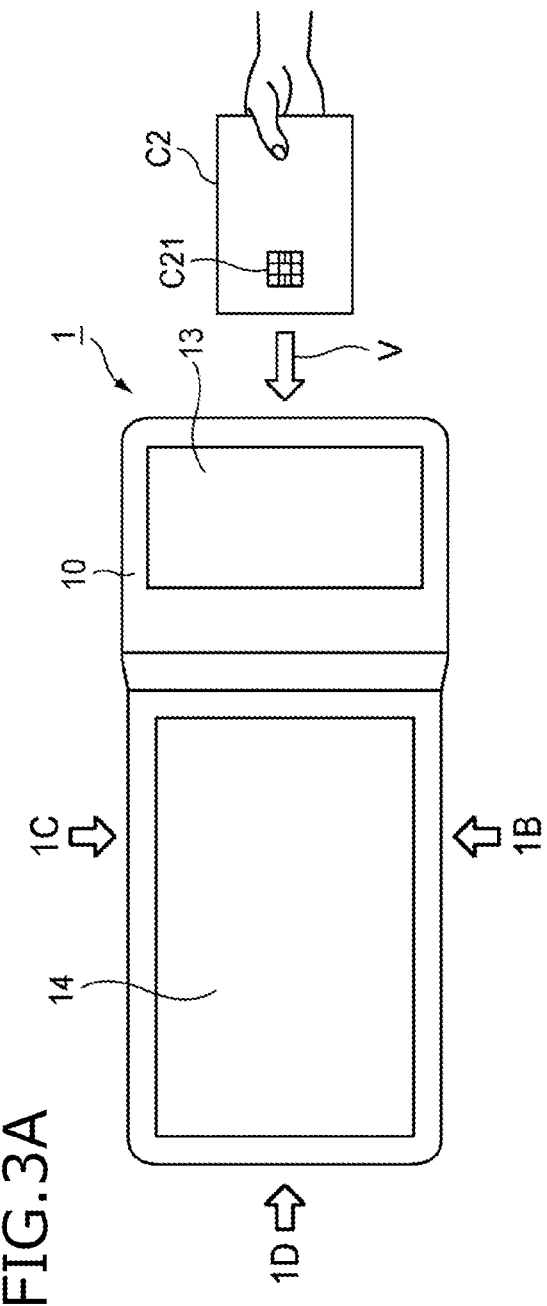
FIGS. 3A and 3B are a top view and a side view respectively, which show a method of using an IC card reader slot 12 in the payment terminal 1 shown in FIGS. 1A to 1C.
Figure 3B:
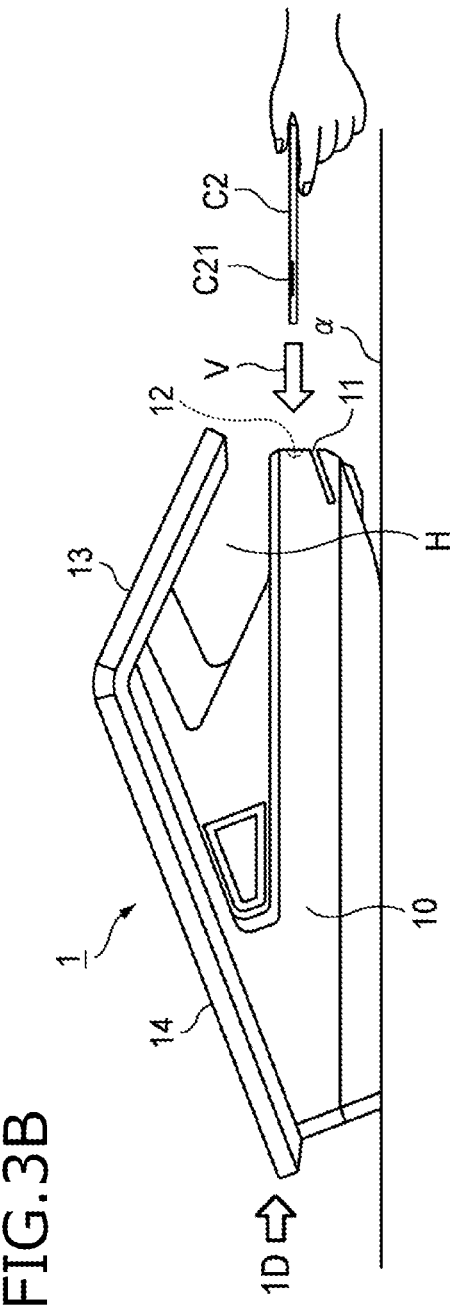

FIGS. 3A and 3B are a top view and a side view respectively, which show a method of using the IC card reader slot 12 in the payment terminal 1 shown in FIGS. 1A to 1C. The user inserts an IC card C2, which is a contact type, in a direction v that is shown in FIG. 3A and is substantially parallel to the plane $\alpha$. The IC card C2 includes a terminal C21 of an IC chip. On the other hand, although not shown, the IC card reader slot 12 includes a connector pin provided therein. When the terminal C21 of the IC chip contacts the connector pin, data is read and written between the payment terminal 1 and the IC card C2.

Here, when comparing FIGS. 2A and 2B with FIGS. 3A and 3B, an angle formed between the direction w, which is a swipe direction of the magnetic card C1, and the direction v, which is an insertion direction of the IC card C2 that is the contact type, is substantially a right angle. That is, the IC card reader slot 12 and the magnetic card reader slot 11 are arranged so that the direction of inserting a card into the IC card reader slot 12 and the direction of swiping the magnetic card into the magnetic card reader slot 11 are substantially perpendicular to each other.

The substantially right angle may not be strictly a right angle (90 degrees), and may be, for example, an angle of about 90 degrees±10 degrees. The directions in which the user moves the cards (C1, C2) are greatly different in different payment methods, so that the user can perform payment appropriately by a desired payment method without confusing the plurality of payment methods.

The IC card reader slot 12 is arranged at a certain height from the plane $\alpha$ so that the hand of the user does not collide with the plane $\alpha$ at the time of inserting the IC card C2 that is a contact type into the IC card reader slot 12.

Figure 4A:
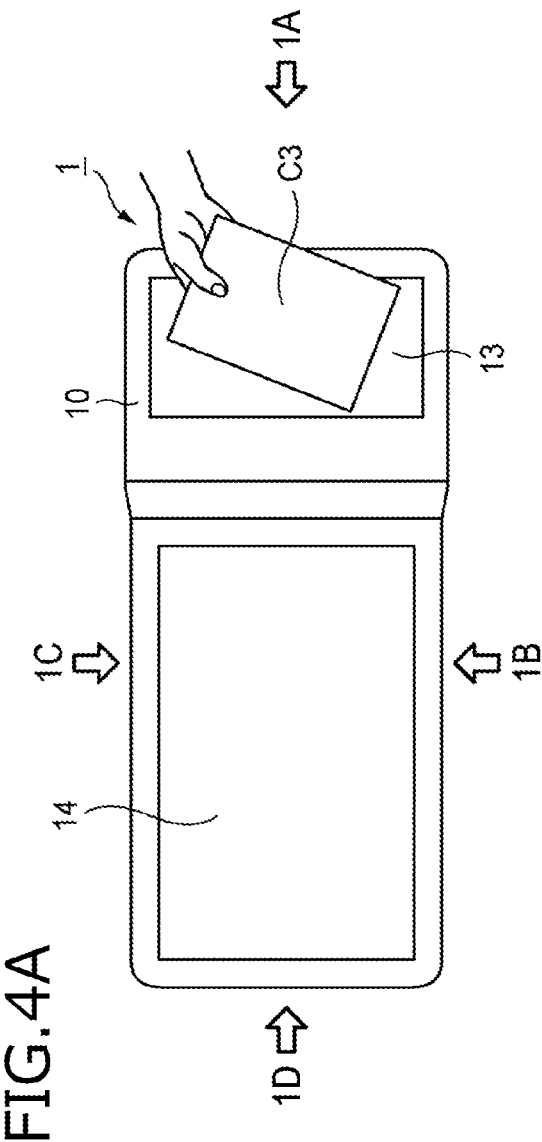
FIGS. 4A and 4B are a top view and a side view respectively, which show a method of using contactless payment in the payment terminal 1 shown in FIGS. 1A to 1C.
Figure 4B:
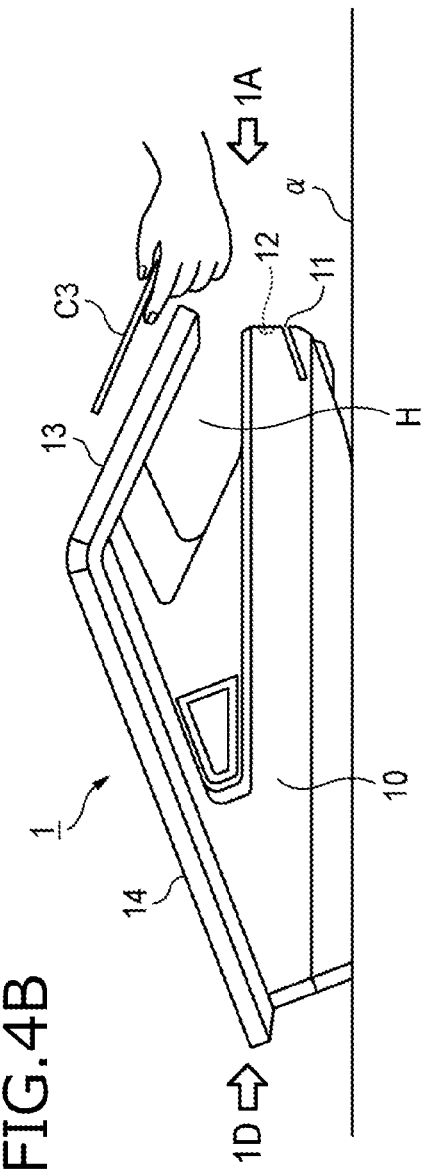
Figure 5B:
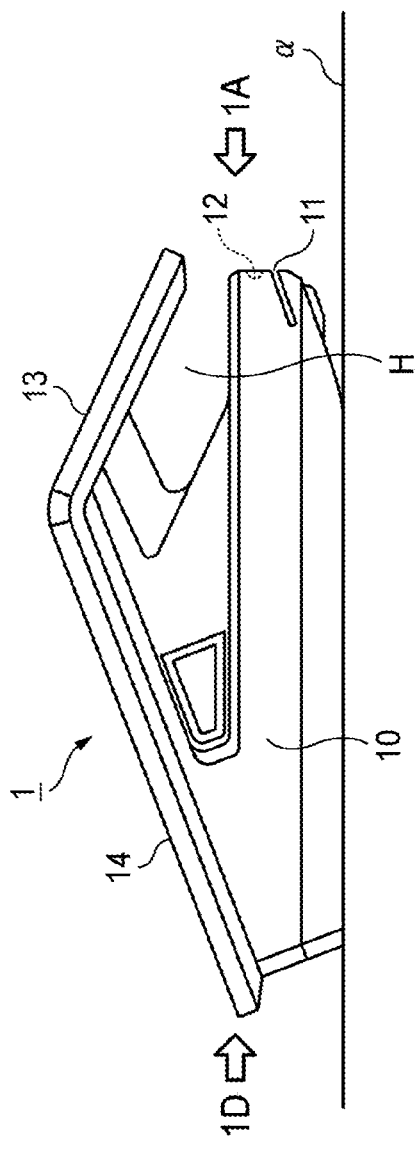
FIGS. 5A and 5B are a view showing a configuration and a view showing a reaction area of an antenna respectively, which show a board 13 having a touch area for contactless payment.
Figure 5A:
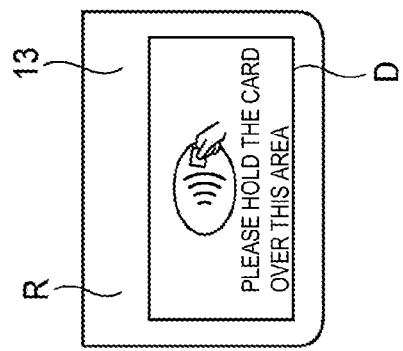

FIGS. 4A and 4B are a top view and a side view respectively, which show a method of using contactless payment in the payment terminal 1 shown in FIG. 1. FIGS. 5A and 5B are a view showing a configuration and a view showing a reaction area of an antenna respectively, which show the board 13 having a touch area for contactless payment.

As described above, the payment terminal 1 includes the board 13 having a touch area for contactless payment. As shown in FIGS. 4A and 4B, the user brings the card C3 used for the contactless payment closer to the board 13 or touches the board 13, thereby reading and writing data between the payment terminal 1 and the card C3 are performed. It is also possible to perform contactless payment using a smartphone or the like instead of the card C3.

As shown in FIG. 5A, the board 13 has a touch area R. In the drawing, the touch area R extends across the entire board 13. However, the touch area R may be provided on a part of the board 13.

A display D may be provided in the touch area R. With the display D, visual information can be provided to the user.

Although not shown, the payment terminal 1 includes an antenna used in contactless payment. For example, the antenna is arranged around the display D. However, the arrangement place of the antenna is not limited to this example. A weak radio wave generated from the antenna applies activation power to the card C3, and the antenna transmits data to the card C3 and receives data from the card C3.

At this time, as shown in FIG. 5B, a reaction area exists in an area in the vicinity obliquely upward from the board 13 having a touch area for contactless payment. The reaction area is an area where the antenna reacts. When the card C3 or the like enters the reaction area, the payment terminal 1 recognizes the card C3, and subsequent payment processing can be triggered.

When the user moves the card so as to pass through the reaction area, the contactless payment may be performed even when the user wants the payment with the contact IC card or the payment with the magnetic card. That is, erroneous recognition of the payment unit may occur.

However, such erroneous recognition does not occur in the payment terminal 1 of the present disclosure. This is because, in the payment terminal 1 of the present disclosure, the arrangement is devised so that the card owned by the user does not pass through the reaction area when the payment with the magnetic card or the payment with the contact IC card is performed.

The direction of the board 13 having the touch area for contactless payment is obliquely upward toward the user facing the front of the surface having the IC card reader slot 12. In addition, the IC card reader slot 12 and the magnetic card reader slot 11 according to the other two payment methods are arranged closer to the plane α.

When the user attempts to perform payment other than the contactless payment using the payment terminal 1 having the above configuration, the card used for the payment is moved closer to the plane α relative to the reaction area. In this way, the card used for the payment does not pass through the reaction area. Therefore, the above-described erroneous recognition does not occur.

In order to ensure that the card used for the payment other than the contactless payment does not pass through the above-described reaction area, the magnetic card reader slot 11 may be arranged at a height equal to or lower than a half of the height of a first point P1 from the plane α described below (see FIG. 6). More specifically, both the magnetic card reader slot 11 and the IC card reader slot 12 may be arranged at the height equal to or lower than the half of the height of the first point from the plane. With this configuration, the magnetic card reader slot 11 and the IC card reader slot 12 can be separated from the above-described reaction area while keeping the size of the payment terminal 1 small. As a result, the above-described erroneous recognition can be avoided more reliably.

Further, the board 13 having the touch area is arranged to prevent operation of swinging down the card from the top of the payment terminal 1 to the plane α. This aspect will be described below with reference to FIG. 6.

Figure 6:
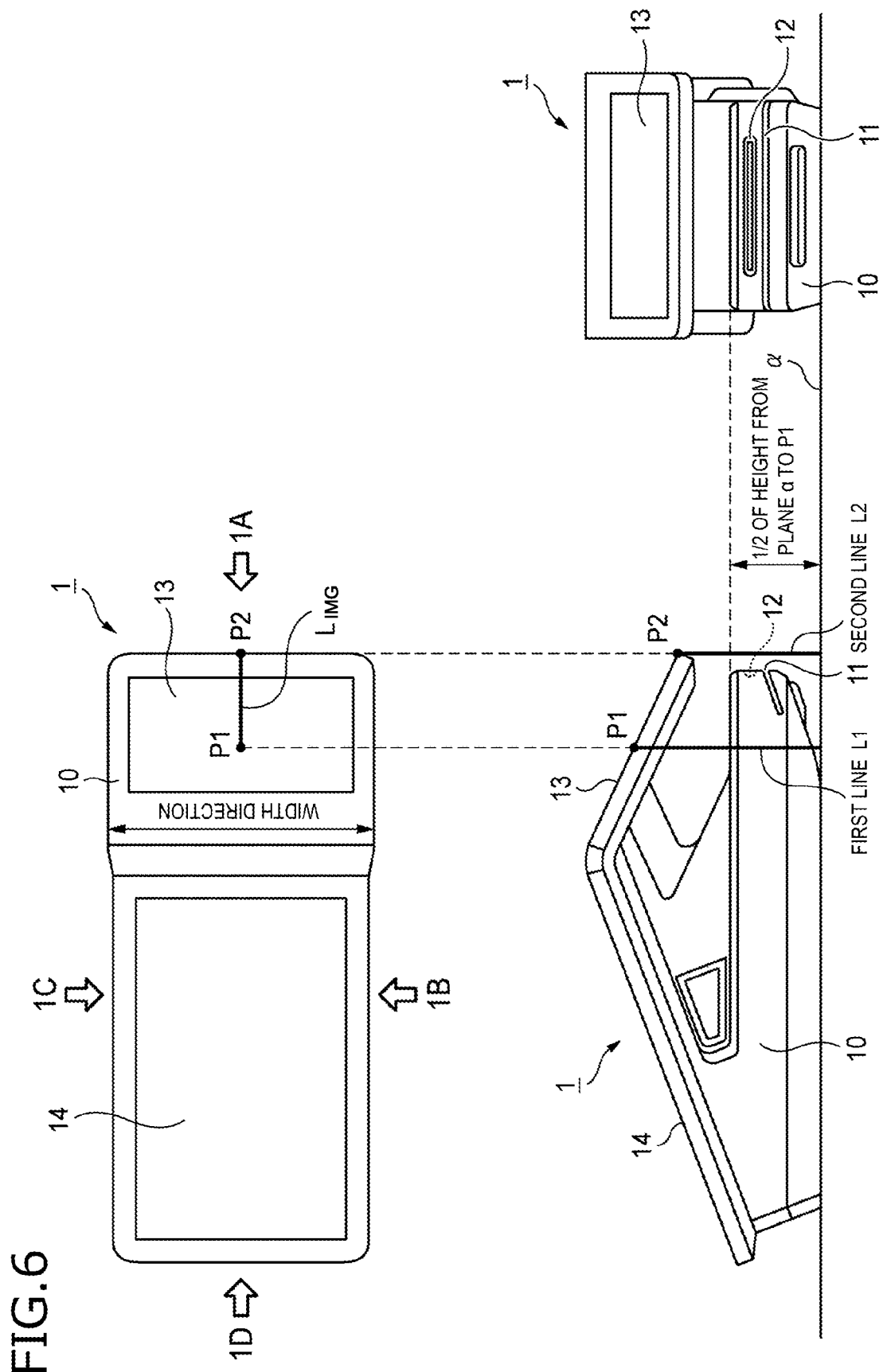
FIG. 6 shows a more specific arrangement of the magnetic card reader slot 11 and the IC card reader slot 12 in the payment terminal 1 shown in FIGS. 1A to 1C.

FIG. 6 shows a more specific arrangement of the magnetic card reader slot 11 and the IC card reader slot 12 in the payment terminal 1 shown in FIGS. 1A to 1C. Here, a center of the board 13 having the touch area is defined as the first point P1, and a vertical line from the first point P1 to the plane α is defined as a first line L1.

When the user faces the front of the IC card reader slot 12, the magnetic card reader slot 11 and the IC card reader slot 12 are inside the width of the board 13 having the touch area as viewed from the user (see FIG. 6).

That is, the board 13 having the touch area covers the magnetic card reader slot 11 and the IC card reader slot 12 from above. With this configuration, the user who wants to use the magnetic card reader slot 11 or the IC card reader slot 12 normally moves the card used for the payment from below. That is, it is possible to prevent the card used for the payment from passing through the above-described reaction area.

The magnetic card reader slot 11 and the IC card reader slot 12 may be arranged closer to the user relative to the first line L1. This arrangement is related to the smoothness of the payment operation.

For example, when the magnetic card reader slot 11 and the IC card reader slot 12 are arranged on a side opposite to the user relative to the first line L1, the positions of these slots are located at an inside (the side far from the user) relative to the board 13 having the touch area for contactless payment. Then, it is difficult for the user to insert the card into the magnetic card reader slot 11 and the IC card reader slot 12 because the board 13 having the touch area for contactless payment becomes an obstacle.

However, for example, as shown in the drawing, when the magnetic card reader slot 11 and the IC card reader slot 12 are arranged closer to the user relative to the first line L1, the above inconvenience does not occur and the payment operation by the user becomes smooth.

Further, as further shown in FIG. 6, it is assumed that the user faces the front of the IC card reader slot 12, and an imaginary line $L_{IMG}$ extends from the center of the board 13 having the touch area for contactless payment to the user along a surface of the board 13. A position where the imaginary line $L_{IMG}$ intersects an edge of the board 13 having the touch area for contactless payment is defined as a second point P2. A vertical line from the second point P2 to the plane α is defined as a second line L2.

When the user faces the front of the IC card reader slot 12, the magnetic card reader slot 11 and the IC card reader slot 12 are arranged inside the width of the board having the touch area as viewed from the user, and are arranged between the first line L1 and the second line L2.

The magnetic card reader slot 11 and the IC card reader slot 12 are arranged so as to have the positional relationship as described above. Then, since it is possible to prevent the user from swinging down the card based on the positional relationship between each slot and the second line L2, the above-described erroneous recognition can be avoided. Further, the payment operation by the user becomes smooth based on the relationship between each slot and the first line L1 as described above.

As described above, by devising the arrangement on the payment terminal 1, it is possible to simultaneously achieve the miniaturization of the payment terminal, the avoidance of erroneous recognition, the easy understanding for the user, and the smoothness of the payment operation.

Next, referring to FIG. 1 again, an example in which payment is performed using the payment terminal 1 of the present disclosure will be described.

An upper part of the payment terminal 1 of the present disclosure is a mountain shape (convex shape) as viewed from the side (see FIG. 1B). The mountain shape is formed by a first board and a second board, and the first board corresponds to the board 13 having the touch area for contactless payment. That is, the first board is used by the user of the payment terminal 1 to perform payment. On the other hand, the second board 14 is an operation panel for a store clerk.

With the above configuration, the payment terminal 1 placed on the plane α can be simultaneously operated by two persons facing each other. For example, when the payment terminal 1 is placed on a counter of a store, the payment terminal 1 can be operated while a store clerk at the inside of the counter and a visitor (user) at the outside of the counter remain in a facing state.

The board 13 having the touch area for contactless payment corresponding to the first board is as described above. The second board 14 will be described. The second board 14 may include an operation screen (not shown). The operation screen may be, for example, a touch-panel operation screen. However, a physical key (button) or the like other than the touch panel may be provided. The store clerk can operate the payment terminal 1 using the operation screen provided on the second board 14.

The payment terminal 1 may print and output a receipt or the like after payment by the user is performed. A part capable of storing roll paper for receipt may be provided inside the payment terminal 1 (not shown). Here, the operation screen (second board 14) can be used as a roll paper storage lid. For example, the payment terminal 1 may be configured such that the lid rotates around a rotation axis arranged at an end portion of the second board 14 and opens.

In a payment terminal according to the related art, selection of which one of the plurality of payment methods is to be performed is performed by the following procedure, for example.

(Procedure 1) A store clerk asks a user which payment method to use.

(Procedure 2) The user informs the store clerk which payment method to use.

(Procedure 3) The store clerk operates the payment terminal (pressing down a button or the like), and the payment terminal enters a standby state for the selected payment method.

(Procedure 4) The user operates the payment terminal by the selected payment method. For example, when the contactless payment is used, the card is touched at a predetermined place. In the case of the contact IC card payment, the IC card is inserted into a slot for IC card payment.

Here, since the payment terminal 1 of the present disclosure has been devised so as not to generate the above-described erroneous recognition, it is possible to simultaneously activate a plurality of payment methods. More specifically, it is possible to simultaneously await the magnetic card payment, the contact IC card payment, and the contactless payment.

Therefore, when the payment terminal 1 of the present disclosure is used, it is not necessary to change the payment method by the store clerk. The user of the payment terminal 1 of the present disclosure only needs to operate a card or the like according to the payment method used. Since the payment terminal 1 is capable of simultaneously awaiting the plurality of payment methods, the payment processing can be performed with a payment method in accordance with operation of a card or the like by the user. That is, by using the payment terminal 1 of the present disclosure, it is possible to eliminate the above (Procedure 1) to (Procedure 3). In this way, the payment method can be selected only by operation of a card or the like by the user without involvement of the store clerk.

As shown in FIG. 1C, the payment terminal 1 may include the open space H. The open space H may be provided between the board 13 having the touch area for contactless payment and the IC card reader slot 12. This open space separates the area used for the contactless payment method and the area used for other payment methods (contact IC card, and magnetic card).

More specifically, as shown in FIGS. 1A to 1C, the opening space H may be arranged across the surface (a surface shown in FIG. 1C) with the IC card reader slot 12 and the two side surfaces (the surface shown in FIG. 1B and a surface of the back side thereof) next to the surface with the IC card reader slot 12. With this open space H, when a user operates a card or the like (in particular, when a magnetic card is swiped), the hand of the user does not collide with the payment terminal 1, and smooth payment operation can be performed.

In addition, the open space H may be arranged along a part of the side surfaces 13S of the board 13 having the touch area for contactless payment. In the example of FIG. 1, the open space H is arranged substantially across the entire side surfaces 13S of the board 13. Accordingly, an advantage of increasing the open space H is as follows.

The payment terminal is a device that deals with money information, so that there is a request from the viewpoint of security. For example, there is a restriction that an unnecessary space (dead space) must not be provided in a housing of the payment terminal. When there is an unnecessary space in the housing, there is room for fraud such as embedding a device for hacking the payment terminal in the space. For this reason, an unnecessary space is not provided in the housing of the payment terminal.

On the other hand, it is intended that the erroneous recognition does not occur as described above in the payment terminal 1 of the present disclosure, and the board 13 having the touch area for contactless payment is separated from the slot according to other payment methods. When a space for the separation is provided inside the payment terminal 1, it is not possible to respond to a request from the viewpoint of security as described above.

Therefore, in the payment terminal 1 of the present disclosure, the open space H is arranged along a part of the side surfaces 13S as described above. With this configuration, there is no unnecessary space in the payment terminal 1, and it is possible to provide the payment terminal 1 in response to a request from the viewpoint of security.

As described above, in the payment terminal of the present disclosure, the magnetic card reader slot may be arranged at the height equal to or lower than the half of the height of the height of the first point from the plane. Further, both the magnetic card reader slot and the IC card reader slot may be arranged at the height equal to or lower than the half of the height of the first point from the plane. With this configuration, the magnetic card reader slot and the IC card reader slot 12 can be separated from the reaction area while keeping the size of the payment terminal small. As a result, erroneous recognition can be avoided more reliably.

In the above configuration, when the user faces the front of the IC card reader slot, a position where the imaginary line, which extends from the center of the board having the touch area to the user along a surface of the board having the touch area, intersects an edge of the board having the touch area is defined as a second point, and a vertical line from the second point to the plane is defined as the second line. In this case, the magnetic card reader slot and the IC card reader slot may be arranged between the first line and the second line when the user faces the front of the IC card reader slot. According to the above configuration, it is possible to prevent the user from swinging down the card or the like from above based on the positional relationship between the second line and the magnetic card payment slot and the contact IC card payment slot. Accordingly, a risk of the erroneous recognition can be avoided. In addition, as described above, the payment operation by the user can be performed smoothly based on the relationship between the first line L1 and the magnetic card reader slot and the IC card reader slot.

In the above configuration, it is possible to simultaneously await the magnetic card payment, the contact IC card payment, and the contactless payment. With the above configuration, the payment method can be selected only by the operation of card or the like by the user without involvement of the store clerk.

In the above configuration, a display may be provided in the touch area for contactless payment, and an antenna used in contactless payment may be arranged around the display. With the above configuration, it is possible to provide visual information to the user who uses the contactless payment.

In the above configuration, when the payment terminal is viewed from a side, the upper part of the payment terminal is a mountain shape. The mountain shape is formed by a first board and a second board. The first board may have a touch area for the contactless payment, and the second board may have an operation panel for the store clerk. With the above configuration, the payment terminal can be operated while a store clerk at the inside of the counter and a visitor (user) at the outside of the counter remain in a facing state.

In the above configuration, the payment terminal may store roll paper inside, and a roll paper storage lid may be the second board. With the above configuration, after the payment is performed, the payment terminal can print and output the receipt.

In the above configuration, an open space is provided between the board having the touch area for the contactless payment and the IC card reader slot. The open space is arranged across a surface with the IC card reader slot and two side surfaces next to the surface with the IC card reader slot. In addition, the open space may be arranged along a part of the side surfaces of the board having the touch area for contactless payment. With the above configuration, when a user operates a card or the like (in particular, when a magnetic card is swiped), the hand of the user does not collide with the payment terminal, and smooth payment operation can be performed. In addition, there is no unnecessary space in the payment terminal, and it is possible to provide a payment terminal in response to a request from the viewpoint of security.

Here, the above embodiments are summarized as follows.

There is provided a payment terminal that includes, a magnetic card reader slot, an IC card reader slot, and a board having a touch area for contactless payment which are arranged in order from the plane on which the payment terminal is placed in a height direction. When a user faces the front of the IC card reader slot, a direction of the board having the touch area for contactless payment is obliquely upward toward the user. The magnetic card reader slot and the IC card reader slot are arranged, so that a direction of inserting the IC card into the IC card reader slot and a direction of swiping the magnetic card into the magnetic card reader slot are substantially perpendicular to each other. When the user faces the front of the IC card reader slot, a direction of the magnetic card reader slot towards the user and is obliquely upward with respect to a direction parallel to the plane. A magnetic head for a magnetic card is positioned closer to the plane relative to a position where the user holds the magnetic card when the user swipes the magnetic card into the magnetic card reader slot. When a center of the board having the touch area is defined as a first point, a vertical line extending from the first point to the plane is defined as a first line, and the user faces the front of the IC card reader slot, the magnetic card reader slot and the IC card reader slot are arranged inside the width of the board having the touch area when viewed by the user, and are arranged closer to the user than the first line.

According to the above configuration, the magnetic card reader slot, the IC card reader slot, and the board having the touch area for contactless payment are aggregated at a side of the user and are aligned in the vertical line of the plane on which the payment terminal is placed, and thus easy understanding when viewed by the user can be achieved. In addition, the operation methods (touch, insertion, and swipe) of cards and the like in the payment methods are different, so that the user is not confused with the payment methods, and the payment methods can be easily understood.

With the above arrangement, the slots and the board according to the plurality of payment methods are collectively arranged closer to the user, so that miniaturization of the payment terminal can be achieved.

The direction of the board having the touch area for contactless payment is obliquely upward toward the user, and the magnetic card reader slot and the IC card reader slot are arranged closer to the plane relative to the touch area for contactless payment. That is, the touch area for contactless payment is separated from the slots according to other payment methods. In this way, when the user uses the magnetic card reader slot or the IC card reader slot, the card is inserted below the touch area for contactless payment. Accordingly, the above-described erroneous recognition does not occur.

Even if the magnetic card reader slot is arranged near the plane, the hand of the user does not collide with the plane when the magnetic card is swiped since the direction of the open space of the magnetic card leader slot is obliquely upward. The magnetic card reader slot, the IC card reader slot, and the board having the touch area for contactless payment are arranged side by side in a vertical direction above the plane, so that the distance by which the user moves the card or the like is short. That is, the payment operation becomes smooth.

For example, as described above, miniaturization of the payment terminal, avoidance of erroneous recognition, easy understanding for the user, and smoothness of the payment operation can be simultaneously achieved.

According to the present disclosure it is possible to provide a payment terminal that simultaneously achieves miniaturization of the payment terminal, avoidance of erroneous recognition, easy understanding for the user, and smoothness of the payment operation.

Although various embodiments have been described above with reference to the drawings, the present invention is not limited to such examples. It will be apparent to those skilled in the art that various changes and modifications can be conceived within the scope of the appended claims, and it is to be understood that they also belong to the technical scope of the present invention. In addition, constituent elements in the above-described embodiments may be operationally combined within a range not departing from the spirit of the invention.

This application is based on Japanese Patent Application (No. 2019-083216) filed on Apr. 24, 2019, the contents of which are incorporated herein by reference.

What is claimed is:

1. A payment terminal comprising:
a magnetic card reader slot having a magnetic head, the magnetic head being positioned closer to a plane on which the payment terminal is placed than a part of a magnetic card where a user holds when swiping the magnetic card into the magnetic card reader slot;
an IC card reader slot configured to be front of a user; and
a first board with a touch area for a contactless payment arranged diagonally upward toward the user, wherein
the magnetic card reader slot is arranged toward the user obliquely upward with respect to a direction parallel to the plane;

the magnetic card reader slot and the IC card reader slot are arranged, so that a swipe direction of the magnetic card into the magnetic card reader slot and an insertion direction of an IC card into the IC card reader slot are substantially perpendicular to each other; and the magnetic card reader slot, the IC card reader slot, and the first board are arranged in order from the plane in a height direction.

2. The payment terminal according to claim 1, wherein:
a center of the first board is defined as a first point, a vertical line extending from the first point to the plane on which the payment terminal is placed is defined as a first line, and the magnetic card reader slot and the IC card reader slot are arranged closer to the user than the first line, and are arranged inside a width of the first board.

3. The payment terminal according to claim 2, wherein:
the magnetic card reader slot is arranged at a height equal to or lower than a half of the height of the first point from the plane.

4. The payment terminal according to claim 2, wherein:
both the magnetic card reader slot and the IC card reader slot are arranged at a height equal to or lower than a half of the height of the first point from the plane.

5. The payment terminal according to claim 3, wherein:
a second point is defined at a position where an imaginary line extending from the first point to the user along a surface of the first board intersects an edge of the first board, a second line is a vertical line extending from the second point to the plane, and the magnetic card reader slot and the contact IC card reader slot are arranged between the first line and the second line.

6. The payment terminal according to claim 5, wherein:
awaiting states for a magnetic card payment, a IC card payment, and the contactless payment are simultaneously established.

7. The payment terminal according to claim 5, wherein:
a display is arranged in the first board, and
an antenna used for the contactless payment is arranged around the display.

8. The payment terminal according to claim 5, wherein:
an upper part of the payment terminal has a convex shape in view from a side view, the convex shape is formed by the first board and a second board, and the second board has an operation panel for a store clerk.

9. The payment terminal according to claim 8, wherein:
a roll paper is stored in the payment terminal, and the second board is a lid of a storage for the roll paper.

10. The payment terminal according to claim 5, wherein:
an open space is arranged between the IC card reader slot and the first board, and the open space is arranged across the surface with the IC card reader slot and two side surfaces next to the surface with the IC card reader slot.

11. The payment terminal according to claim 10, wherein:
the open space is arranged along a part of a side face of the first board.

12. The payment terminal according to claim 4, wherein:
a second point is defined at a position where an imaginary line extending from the first point to the user along a surface of the first board intersects an edge of the first board, a second line is a vertical line extending from the second point to the plane, and the magnetic card reader slot and the contact IC card reader slot are arranged between the first line and the second line.

13. The payment terminal according to claim 12, wherein:
awaiting states for a magnetic card payment, a IC card payment, and the contactless payment are simultaneously established.

14. The payment terminal according to claim 12, wherein:
a display is arranged in the first board, and
an antenna used for the contactless payment is arranged around the display.

15. The payment terminal according to claim 12, wherein:
an upper part of the payment terminal has a convex shape, the convex shape is formed by the first board and a second board, and the second board has an operation panel for a store clerk.

16. The payment terminal according to claim 15, wherein:
a roll paper is stored in the payment terminal, and the second board is a lid of a storage for the roll paper.

17. The payment terminal according to claim 12, wherein:
an open space is arranged between the IC card reader slot and the first board, and the open space is arranged across the surface with the IC card reader slot and two side surfaces next to the surface with the IC card reader slot.

18. The payment terminal according to claim 17, wherein:
the open space is arranged along a part of a side face of the first board.

* * * * *